United States Patent
Li et al.

(10) Patent No.: US 10,602,110 B2
(45) Date of Patent: Mar. 24, 2020

(54) CHROMA RESHAPING BASED ON JUST NOTICEABLE DIFFERENCES

(71) Applicant: Dolby Laboratories Licensing Corporation, San Francisco, CA (US)

(72) Inventors: Cheng-Chi Li, Kaohsiung (TW); Guan-Ming Su, Fremont, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

(21) Appl. No.: 16/327,758

(22) PCT Filed: Aug. 28, 2017

(86) PCT No.: PCT/US2017/048860
§ 371 (c)(1),
(2) Date: Feb. 22, 2019

(87) PCT Pub. No.: WO2018/039665
PCT Pub. Date: Mar. 1, 2018

(65) Prior Publication Data
US 2019/0199989 A1 Jun. 27, 2019

Related U.S. Application Data

(60) Provisional application No. 62/379,930, filed on Aug. 26, 2016.

(30) Foreign Application Priority Data
Aug. 26, 2016 (EP) ..................... 16185961

(51) Int. Cl.
*H04N 9/68* (2006.01)
*G06T 5/00* (2006.01)
*H04N 9/64* (2006.01)
(Continued)

(52) U.S. Cl.
CPC .............. *H04N 9/68* (2013.01); *G06T 5/009* (2013.01); *H04N 9/646* (2013.01); *H04N 9/648* (2013.01); *H04N 9/77* (2013.01); *H04N 17/02* (2013.01)

(58) Field of Classification Search
None
See application file for complete search history.

(56) References Cited

U.S. PATENT DOCUMENTS

| 8,811,490 | B2 * | 8/2014 | Su | H04N 19/30 375/240.16 |
| 9,264,681 | B2 * | 2/2016 | Gish | G09G 5/02 |

(Continued)

OTHER PUBLICATIONS

Pu, F. et al., "Comments on Reshaping for HDR/WCG compression", 113 MPEG Meeting, Oct. 19, 2015 to Oct. 23, 2015, Geneva, (Motion Picture Expert Group or ISO/IEC JTC1/SC29/WG11)., No. m37267, Oct. 21, 2015.

(Continued)

*Primary Examiner* — Talha M Nawaz

(57) ABSTRACT

Methods and systems for chroma reshaping are applied to images or video frames. The method comprises receiving at least one image or video frame. The color space of the at least one image or video frame is partitioned in M1×M2×M3 non-overlapping bins. For each bin it is determined whether it is a valid bin, for which the at least one image or video frame has at least one pixel with a color value falling within said bin. For each chroma channel, a required number of codewords is calculated for representing two color values in said valid bin that have consecutive codewords for the respective chroma channel without a noticeable difference. At least one content-aware chroma forward reshaping function is generated based on the calculated required numbers of codewords and applied to the at least one image or video frame.

16 Claims, 5 Drawing Sheets

(51) Int. Cl.
*H04N 9/77* (2006.01)
*H04N 17/02* (2006.01)

(56) References Cited

U.S. PATENT DOCUMENTS

| | | | | |
|---|---|---|---|---|
| 9,578,324 B1* | 2/2017 | Wang | ............... | H04N 19/176 |
| 2009/0284457 A1* | 11/2009 | Botzas | ............. | G09G 3/3406 |
| | | | | 345/102 |
| 2013/0195176 A1* | 8/2013 | Song | ............... | H04N 19/176 |
| | | | | 375/240.02 |
| 2016/0134872 A1* | 5/2016 | Su | .................... | H04N 19/176 |
| | | | | 375/240.03 |

OTHER PUBLICATIONS

Zicong, Mai et. al., "Optimizing a Tone Curve for Backward-Compatible High Dynamic Range Image and Video Compression", IEEE Transactions on Image Processing, Jun. 1, 2011, vol. 20, Issue: 6, pp. 1558-1571.

Kerofsky, Louis et al., "Recent developments from MPEG in HDR video compression", 2016 IEEE International Conference on Image Processing (ICIP), Aug. 19, 2016, pp. 879-883.

Toran, Lu. et al., "ITP Colour Space and Its Compression Performance for High Dynamic Range and Wide Colour Gamut Video Distribution", Feb. 5, 2016, XP055282146, URL:http://wwwen.zte.cm.cn/endata/magazine/ztecommunications/2016/1/articles/201603 (retrieved on Jun. 20, 2016) the whole document.

ITU-R REC BT.2100-0 "Image Parameter Values for High Dynamic Range Television for Use in Production and International Programme Exchange" Jul. 2016.

* cited by examiner

CHROMA RESHAPING BASED ON JUST NOTICEABLE DIFFERENCES

CROSS-REFERENCE TO RELATED APPLICATIONS

This application claims priority to European Patent Application No. 16185961.6 filed 26 Aug. 2016 and U.S. Patent Application No. 62/379,930 filed Aug. 26, 2016 which are hereby incorporated by reference in their entirety.

TECHNICAL FIELD

The present disclosure relates to video processing. More particularly, it relates to chroma reshaping based on just noticeable differences.

BRIEF DESCRIPTION OF DRAWINGS

The accompanying drawings, which are incorporated into and constitute a part of this specification, illustrate one or more embodiments of the present disclosure and, together with the description of example embodiments, serve to explain the principles and implementations of the disclosure.

SUMMARY

Figure 1:
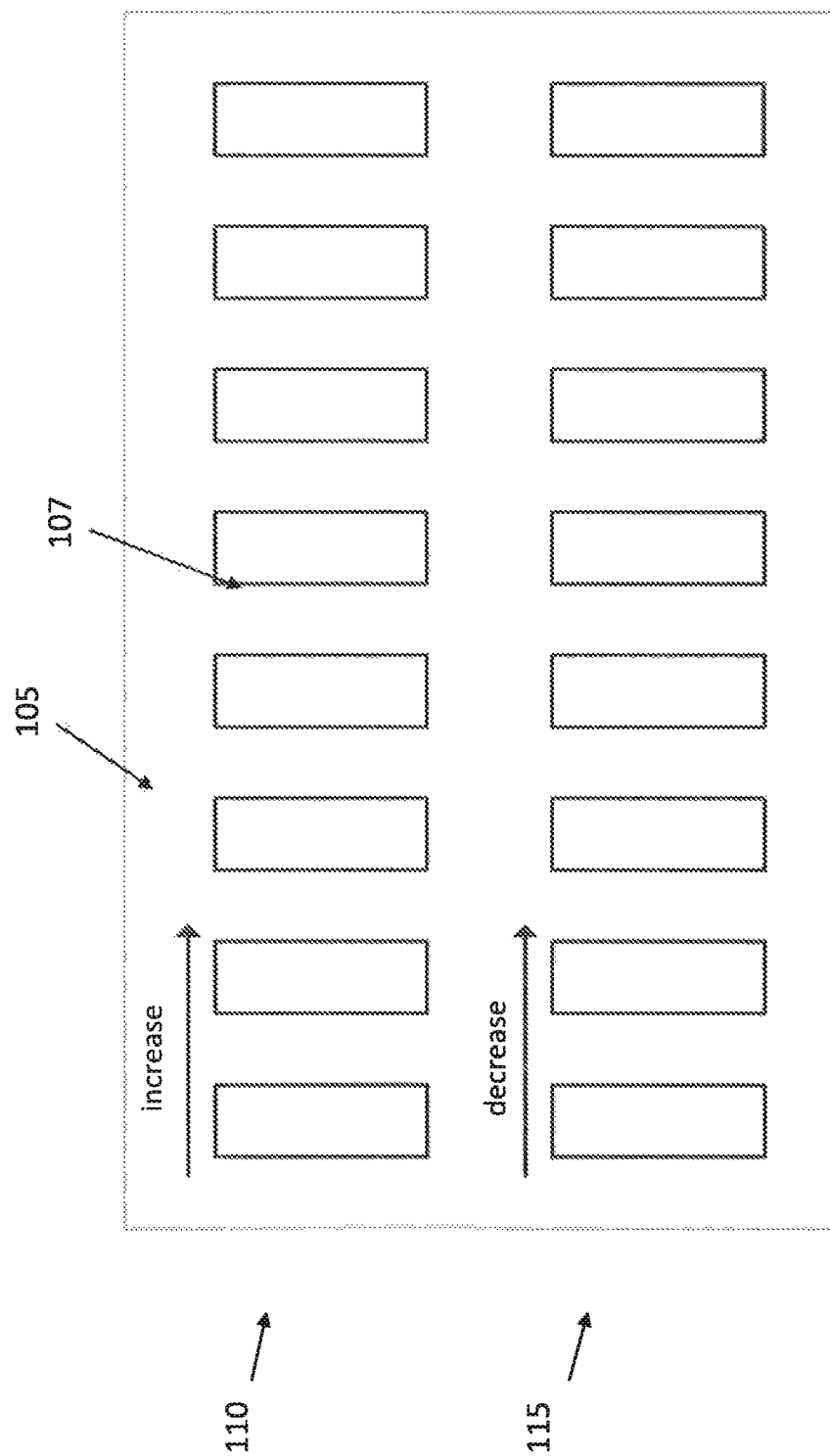
FIG. 1 illustrates an example of a test pattern.

This disclosure relates to methods and systems for chroma reshaping. The method comprises receiving at least one image or video frame. The color space of the at least one image or video frame is partitioned in $M_1 \times M_2 \times M_3$ non-overlapping bins. For each bin it is determined whether it is a valid bin, for which the at least one image or video frame has at least one pixel with a color value falling within said bin. For each chroma channel, a required number of codewords is calculated for representing two color values in said valid bin that have consecutive codewords for the respective chroma channel without a noticeable difference. At least one content-aware chroma forward reshaping function is generated based on the calculated required numbers of codewords and applied to the at least one image or video frame.

The disclosure further relates to a computer program product having instructions which, when executed by a computing device or system, cause said computing device or system to perform any of the methods of this disclosure.

DETAILED DESCRIPTION

The present disclosure describes methods to reshape chroma based on just noticeable differences (JNDs). As known to the person of ordinary skill in the art, a just noticeable difference refers to the human perception of small differences in video processing parameters. For example, the hue or intensity of a color may be changed slightly, and the difference may or may not be perceived by a viewer, depending on the numerical value of the change in the parameters, and on the quality of perception of the viewer. A change in a video parameter can be considered as just noticeable, for example, when a viewer will detect it at least half the time.

In the following, reference is made to dynamic ranges, for example extended dynamic range (EDR), which is a dynamic range higher than a standard dynamic range (SDR), and lower than a high dynamic range (HDR). As understood by the person of ordinary skill in the art, frames with an extended dynamic range refer to frames which have a dynamic range which is broader than a standard dynamic range. The term 'dynamic range' may relate to a capability of the human visual system (HVS) or a display to perceive or display a range of intensity (e.g., luminance, luma) in an image, e.g., from darkest blacks (darks) to brightest whites (highlights). As used herein, the term high dynamic range (HDR) relates to a dynamic range breadth that spans the some 14-15 or more orders of magnitude of the human visual system (HVS). As used herein, EDR may relate to a DR that spans 5 to 6 orders of magnitude; thus while perhaps somewhat narrower in relation to true scene referred HDR, EDR nonetheless represents a wide DR breadth and may also be referred to as HDR.

The present disclosure relates to JNDs in the perception of colors. The required codeword to distinguish two colors by a JND, in the chroma channel, is not uniform and can change with the color range and channel. As described herein, a non-linear reshaping function can be used to equalize the non-uniform JND. The reshaping function may be single-channel or multi-channel. By equalizing the JND, it is possible to reduce the computational cost of chroma by reducing the number of bits necessary. As a consequence, a greater number of bits can be assigned to luma, thereby increasing the picture quality.

Forward reshaping may refer to the process of mapping (or quantizing) an image from its original bit depth to an image of a lower or the same bit depth, to allow compressing the image using existing coding standards or devices. Forward reshaping may be applied in an encoder. In a receiver (or decoder), after decompressing the reshaped signal, the receiver may apply an inverse reshaping function.

In some embodiments, the present disclosure describes how to generate a reshaping function based on methods to calculate a just-noticeable-difference (JND) metric, for determining a reshaping function for chroma, using the ICtCp color space. The ICtCp color space is a constant intensity color space based on opposing colors, and is intended to separate the luma and chroma information. The Recommendation ITU-R BT. 2100-0 (July 2016), "*Image parameter values for high dynamic range television for use in production and international programme exchange*," ITU, July, 2016 explains how to convert from RGB to ICtCp, and is incorporated herein by reference in its entirety. In other embodiments, the methods described herein may be applied to other color spaces as well, such as the IPT color space.

In a first step, each chroma channel can be partitioned into multiple non-overlapping bins. With regard to this step, the person of ordinary skill in the art will understand that a color histogram of an image can be produced first by discretization of the colors in the image into a number of bins, and counting the number of image pixels in each bin. For each bin, it is possible to calculate the required number of codewords necessary to observe a difference in color in each bin. The required number of codewords represents the bit depth necessary to avoid quantization distortion and color artifacts.

After the bit depth measurement, it is possible to generate a content-aware chroma reshaping function by checking the color distribution, building a codeword bit depth look-up table (LUT), and form a forward reshaping LUT. In other words, the reshaping function is generated based on the image quantization.

As described herein, two exemplary approaches can be taken according to the hardware available to implement the video encoding algorithms. However, other embodiments may be based on different approaches.

In some embodiments, the algorithm comprises the following steps. After the bit depth measurement, which establishes the required bit depth to avoid color artifacts, the content-aware chroma reshaping function is generated by checking the color distribution, building the codeword bit depth LUT, and forming the forward reshaping LUT. The backward reshaping LUT can be obtained via inverse scanning of the forward reshaping LUT. In some embodiments, the backward reshaping LUT can be approximated by a multi-piece $2^{nd}$ order polynomial function.

In other embodiments, the reshaping function is multi-channel. This process can be termed multi-channel reshaping (to be referred to as MMR). A 3D-LUT is generated, based on the JND, to map multiple input channels to the target color channel, to obtain a first reshaped signal. Subsequently, the 3D-LUT can be approximated, based on MMR. The backward reshaping function is obtained via applying MMR again based on the targeted reshaped signal and original extended dynamic range (EDR) signal. The MMR method is described, for example, in U.S. Pat. No. 8,811,490 B2, the disclosure of which is incorporated herein by reference in its entirety.

In the following, a chroma JND measurement is described. Although, in the present disclosure, the generation of the reshaping function is based on a point termed JND, this point is at the boundary of almost detection of a color difference, but it is not actually a noticeable color difference. Therefore, even though the difference is termed just noticeable, in the present disclosure it is intended that the difference is barely not noticeable. In other words, the difference is just short of JND.

In the target color space, a partition can be generated with M×M×M small cubes, also referred to as bins. For example, M=16. With a $B_I$-bit input signal, the number of codewords in each cubic bin in each direction is then $$L = \frac{2^{B_I}}{M}.$$

In some embodiments, the partition may comprise $M_1 \times M_2 \times M_3$ parallelepipeds (e.g., 16×32×24) instead of cubes. For example, the color space may be partitioned into $M_1 \times M_2 \times M_3$ cuboid bins. For a $B_I$-bit input signal, the number of codewords in each parallelepiped bin in each direction is $$L_r = \frac{2^{B_I}}{M_r},$$

with r=1, 2, 3. In the following examples, a partitioning into cubic bins is used. However, the disclosure is not limited to cubic partitioning, and parallelepiped partitioning as described above may be used instead.

The color cube index (i,t,p) can be used, where 0≤i<M; 0≤t<M; 0≤p<M. The center of each cube in each direction is $$\left(\frac{L}{2} - 1 + i \cdot L, \frac{L}{2} - 1 + t \cdot L, \frac{L}{2} - 1 + p \cdot L\right).$$

The JND measurement can be carried out for each chroma channel. For example, two measurements can be carried out for a first and second chroma channel.

For the first chroma channel ($C_T$ channel), the following algorithm can be used:

```
for i = 0, ..., M-1      // for the luma channel
  for p = 0, ..., M-1    // for the 2^nd color channel
    for t = 0, ..., M-1  // for the 1^st color channel
      V[ ] = 0;
      for k = -K, -K+0.5,...,0, ...,K-0.5, K   // for different codeword distances
        create a test pattern with two blocks.(e.g., K = 7)
```

First block has color $\left(\frac{L}{2} - 1 + i \cdot L, \frac{L}{2} - 1 + t \cdot L, \frac{L}{2} - 1 + p \cdot L\right)$ $\Delta = \text{sign}(k) \cdot 2^{|k|}$ Second block has color $\left(\frac{L}{2} - 1 + i \cdot L, \frac{L}{2} - 1 + t \cdot L + \Delta, \frac{L}{2} - 1 + p \cdot L\right)$

```
      V[k] = (observe two blocks have different colors) ? 1 : 0
      end
      check the maximal absolute k which cannot see the color difference
```

$k_1 = \underset{k}{\text{argmax}}\{k \mid V[k] = 0; k \geq 0\}$ $k_2 = \underset{k}{\text{argmin}}\{k \mid V[k] = 0; k < 0\} \quad \tilde{k} = \min\{k_1, -k_2\}$ Determine the JND bit depth
$\quad \delta_t(i,t,p) = B_I - |\tilde{k}|$
```
    end
  end
end
```

For the second chroma channel ($C_P$ channel), the following algorithm can be used:

```
for i = 0, ..., M-1        // for the luma channel
  for t = 0, ..., M-1      // for the 1st color channel
    for p = 0, ..., M-1    // for the 2nd color channel
      V[ ] = 0;
      for k = -K, -K+0.5,...,0, ...,K-0.5, K   // for different codeword distances
        create a test pattern with two blocks.
```

First block has color $\left(\frac{L}{2} - 1 + i \cdot L, \frac{L}{2} - 1 + t \cdot L, \frac{L}{2} - 1 + p \cdot L\right)$ $\Delta = \text{sign}(k) \cdot 2^{|k|}$ Second block has color $\left(\frac{L}{2} - 1 + i \cdot L, \frac{L}{2} - 1 + t \cdot L, \frac{L}{2} - 1 + p \cdot L + \Delta\right)$

```
      V[k] = (observe two blocks have different colors) ? 1 : 0
      end
      check the maximal absolute k which cannot see the color difference
```

$k_1 = \underset{k}{\text{argmax}}\{k \mid V[k] = 0; k \geq 0\}$ $k_2 = \underset{k}{\text{argmin}}\{k \mid V[k] = 0; k < 0\}$ $\tilde{k} = \min\{k_1, -k_2\}$ Determine the JND bit depth $\delta_p(i, t, p) = B_T - |\tilde{k}|$

```
    end
  end
end
```

The JND measurements $\{\delta_p(i,t,p)\}$ and $\{\delta_t(i,t,p)\}$ can serve as the minimal required bit depth when constructing the reshaping function. FIG. 1 illustrates an example for the test patterns. In this example, the ICtCp color space will be used.

It is noted that although the JND measurements $\{\delta_p(i,t,p)\}$ and $\{\delta_t(i,t,p)\}$ are expressed in units of bit depth, these measurements do not need to correspond to integer values. For example, in the algorithms above, k loops over $-K$ to $K$ in steps of 0.5, so that the resulting $\{\delta_p(i,t,p)\}$ and $\{\delta_t(i,t,p)\}$ may also be a fraction. Further, it is noted that $\{\delta_p(i,t,p)\}$ and $\{\delta_t(i,t,p)\}$ can be converted to the required number of codewords for the P and T channel respectively—and vice versa, using the relations:

$\delta_p(i,t,p) = \log_2 N_{min}^P$, $\delta_t(i,t,p) = \log_2 N_{min}^t$, wherein $N^P_{min}$ and $N^t_{min}$ represent the required number of codewords for the P and T chroma channel respectively.

In FIG. 1, the values for I, Ct, and Cp are fixed for the background (105), while only the value in one color channel is changed in each rectangle (107). The codeword value difference (between the rectangles and the background) is increased positively for the top row (110) of rectangles, while the codeword value difference is decreased negatively for the bottom row (115) of rectangles. In each row, a minimal absolute codeword value difference, which can be expressed as minimal bit depth, is selected to show the color difference, which is the JND. In other words, the bit depth is adjusted to the appropriate value for the JND in color. Among the two rows (110,115), the largest value (amongst the minimal bit depths) is taken as JND for value (I,Ct,Cp), for one particular color direction. To summarize, for a fixed background (I,Ct,Cp) value, the bit depth of the (I,Ct,Cp) value in the rectangles is varied to find the JND. The largest bit depth (among the minimal bit depths) required for the JND in the rectangles is taken as the overall necessary bit depth required for the JND. In some embodiments, 16×16×16 pictures can be used to measure the JND in each color channel. For example, the top left and bottom left rectangles in FIG. 1 could start at the same codeword value difference, or at different codeword value differences.

In some embodiments, the reshaping chroma function is calculated for a baseline profile of a codec. In these embodiments, a single channel function is generated. More specifically, the baseline profile only allows single-channel multiple-piece polynomials in each channel. Therefore, no cross-channel reshaping method can be used.

To calculate the forward reshaping function, the following steps can be applied: Denote the $k^{th}$ pixel in the I, Ct, Cp channel from the input extended dynamic range (EDR) at frame j as $v_{j,k}^I$, $v_{j,k}^T$ and $v_{j,k}^P$. Denote the $k^{th}$ pixel in the I, Ct, Cp channel for the output reshaped signal at frame j as $s_{j,k}^I$, $s_{j,k}^T$ and $s_{j,k}^P$. Denote the maximal value in the luma channel at frame j as $v_j^{I,H}$. Denote the minimal value in the luma channel at frame j as $v_j^{I,L}$. Denote the maximal value in the $1^{st}$ chroma channel at frame j as $v_j^{T,H}$. Denote the minimal value in the $1^{st}$ chroma channel at frame j as $v_j^{T,L}$. Denote the maximal value in the $2^{nd}$ chroma channel at frame j as $v_j^{P,H}$. Denote the minimal value in the $2^{nd}$ chroma channel at frame j as $v_j^{P,L}$.

For each color cube, the pixel count is $h_j(i,t,p)$. A color cube with a non-zero pixel count is considered a valid cube. To obtain a scene-based solution, comprising a plurality of frames, the extreme value in each statistics within a scene is found: $v_H^I = \max\{v_j^{I,H}, \forall j\}$; $v_L^I = \min\{v_j^{I,L}, \forall j\}$; $v_H^T = \max\{v_j^{T,H}, \forall j\}$; $v_L^T = \min\{v_j^{T,L}, \forall j\}$; $v_H^P = \max\{v_j^{P,H}, \forall j\}$; $v_L^P = \min\{v_j^{P,L}, \forall j\}$.

The sum of the pixel counts is also taken, over J frames:

$$h(i, t, p) = \sum_{j=0}^{J-1} h_j(i, t, p).$$

Subsequently, for each one of the $C_P$ and $C_T$ color channel, the maximum among the calculated JND bit depths is found, for each of the M values of p and t respectively. The maximum among the calculated JND bit depths can be searched along the $C_p$ channel direction with the following algorithm:

```
for p = 0, ..., M-1    // for the 1st color channel
    Q_p = 0
    Q_p = max     {δ_p(i, t, p) | h(i, t, p) > 0}
          0≤i<M
          0≤t<M
    Q_p = α_p · Q_p
end
```

The maximum among the calculated JND bit depths can be searched along the $C_T$ channel direction with the following algorithm:

```
for t = 0, ..., M-1    // for the 2nd color channel
    Q_t = 0
    Q_t = max     {δ_t(i, t, p) | h(i, t, p) > 0}
          0≤i<M
          0≤p<M
    Q_t = α_t · Q_t
end
```

As noted in the algorithm, the maximum is found using valid bins, that is, bins where the pixel count h is greater than zero. The values ($\alpha_p$, $\alpha_t$) in the algorithms above are the factors that allow adjustment of the JND. These factors can be termed adjustment factors. In some embodiments, the not just noticeable difference is used (N-JND). In these embodiments, the value $\alpha_P$ can be calculated as:

$$\alpha_p = \frac{1}{\log_2(N_p)}.$$

Likewise, the bit depth adjustment factor $\alpha_t$ can be calculated as $1/\log_2(N_t)$.

The resulting quantities $Q_t$ and $Q_p$ are content-aware, as they depend on the specific counts for the bins of the specific frames being analyzed and processed.

Having calculated the minimum required bit depths $\delta_t$ and $\delta_p$, and/or the related quantities $Q_t$ and $Q_p$, the forward reshaping function can be constructed. In the following, the method is described with reference to each chroma channel. Without loss of generality, index m is used in the following to denote either p in the P channel or t in the T channel.

Considering that there are M bins, the M just noticeable differences (JNDs) for these M bins can be mapped to M required normalized codewords. The normalized required codeword can be defined as:

$$D_m = \left(\frac{2^{Q_m}}{2^{B_T}}\right)\bigg/ 2^{B_I} \quad \text{for } Q_m > 0,$$

$$D_m = 0 \quad \text{for } Q_m = 0,$$

where $B_T$ is the bit depth in the target domain (container for the output signal, such as 10 bits for HEVC 10 compression).

For example, assuming an equal JND level for all bins, and assuming the required bit depth is 9 bits, then the required normalized codeword $D_m=(2^9/2^{10})/2^{16}=2^{-17}$. Adding together the total required codewords for all 65536 codewords in the input EDR, the result is $65536*D_m=0.5$, for the normalized EDR domain.

Subsequently, after obtaining the required normalized codewords for each bin, the M bins can be extended to all codewords in the EDR domain:

$$d_i = D_m \text{ for } (m-1)W \leq i < mW,$$

where $\{d_i\}$ is the lower bound required codeword, and W is the bin width. Any quantization curve should satisfy this lower bound to avoid generating other color artifacts.

The resulting curve can be smoothened via, for example, simple moving average. The smoothing process can be carried out multiple times to ensure that the curve is smooth and that the reverse curve is easy to be approximated by a multi-piece $2^{nd}$ order polynomial. Therefore, in some embodiments, a multi-piece $2^{nd}$ order polynomial can be used.

In some embodiments, a simple moving average filter can be used for smoothing. To ensure the resultant curve is smooth enough, it can be necessary to cover two bin widths, that is, 2 L. An exemplary moving average filter is:

$$\tilde{s}_i = \sum_{k=-W}^{W} a_k \cdot d_{i+k},$$

where $$a_k = \frac{1}{2W+1}.$$

In some embodiments, a typical value of W allows averaging over at least one bin of data. In some embodiments, as described above, the input is 65536 codewords, and the number of bins is 16. In these embodiments, therefore, each bin contains 4096 codewords and 2 W should be no less than 4096 in order to cover one bin. In other embodiments, W is no less than 1024. The resulting smooth curve can be denoted as $\{\tilde{s}_i\}$. To build the reshaping curve, the cumulative sum of $\tilde{s}_i$ can be calculated as:

$$\hat{S}_i = \sum_{k=0}^{i} \tilde{s}_k.$$

The resultant reshaping curve can be built starting from 0. To maintain a good coding efficiency, it may be better to move to the center point:

$$FLUT_i^P = \hat{S}_{P,i} + \frac{(1-\hat{S}_{v}^{P,H})}{2} \quad \text{for } P \text{ channel,}$$

-continued $$FLUT_i^T = \hat{S}_{T,i} + \frac{(1-\hat{S}_{v,T,H})}{2} \text{ for } T \text{ channel.}$$

Figure 2:
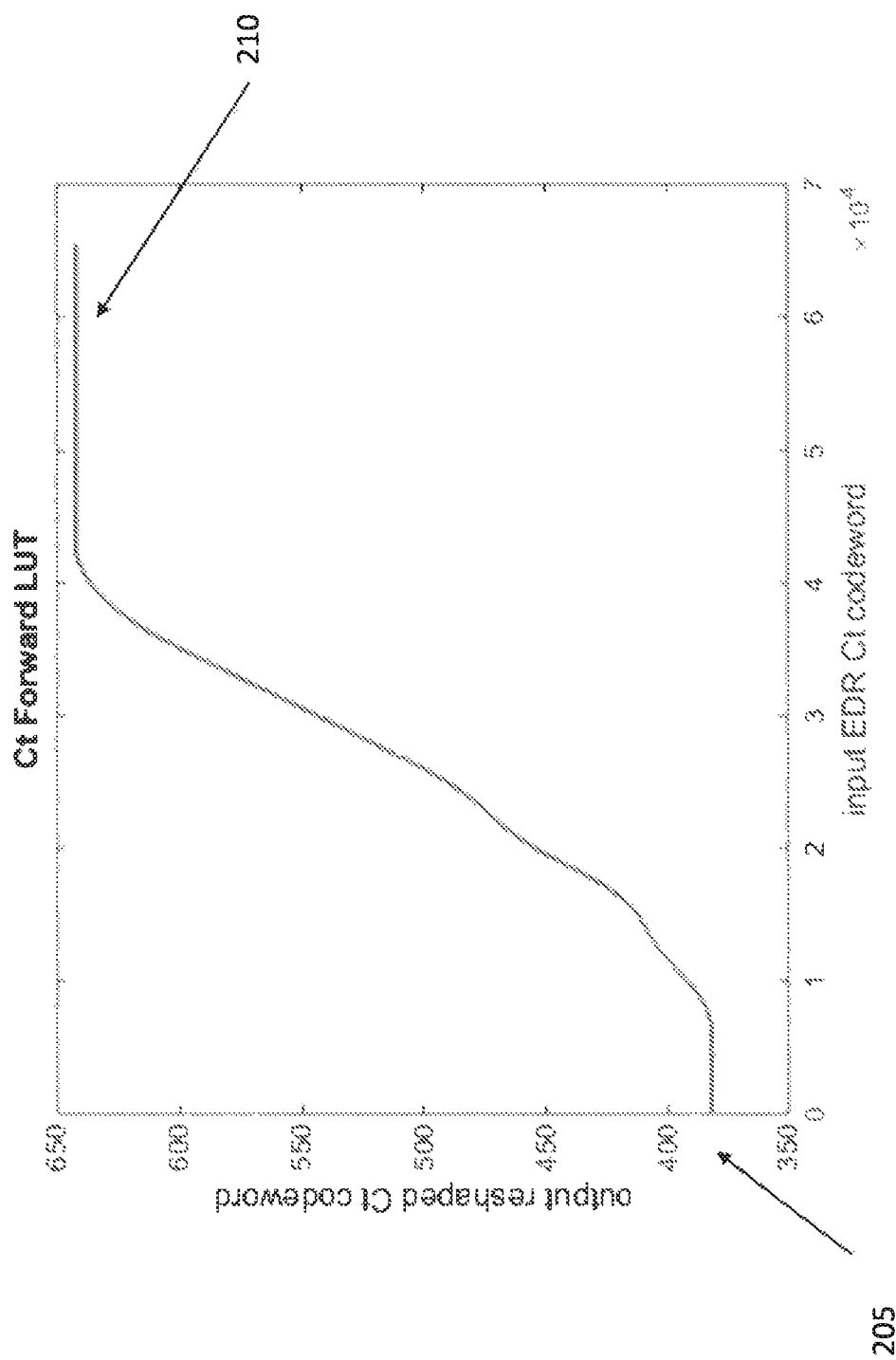
FIG. 2 illustrates an example of a forward reshaping function.

FIG. 2 illustrates an exemplary forward reshaping function, where the output reshaped $C_t$ codewords are obtained from the input EDR $C_t$ codewords. It can be noted that the lower values (205) and the higher values (210) are clipped, as the reshaping is reducing the number of codewords.

The backward reshaping function can be built by searching the reverse tracking of the forward reshaping function.

In other embodiments, the JND-based chroma reshaping function can be generated allowing cross-color channel reshaping. There are several methods to implement multi-dimensional reshaping to take advantage of a non-uniform JND.

Multi-dimensional reshaping can be implemented, for example, by constructing a three-dimensional JND curve. The JND measurement represents the maximal quantization step size possible. The JND measurement also represents the differential value when building the 1D-LUT for reshaping. In other words, the 1D-LUT can be built via the cumulative JND value. For multi-dimensional applications, the JND cube in 3D represents the difference value in 3D space. The 3D-LUT can be also built via constructing a cumulative JND cube. For example, the following calculation can be carried out to generate the 3D-LUT:

$$C_t(i,t,p) = \sum_{\alpha=0}^{i}\sum_{\beta=0}^{t}\sum_{\gamma=0}^{p}(2^{\delta_t(\alpha,\beta,\gamma)}\cdot(h(i,t,p)>0)),$$

$$C_p(i,t,p) = \sum_{\alpha=0}^{i}\sum_{\beta=0}^{t}\sum_{\gamma=0}^{p}(2^{\delta_p(\alpha,\beta,\gamma)}\cdot(h(i,t,p)>0)).$$

Optionally, the adjustment factors $\alpha_t$ and $\alpha_p$ can be taken into account for calculating $C_t$ and $C_p$ as well, by multiplying $\delta_t$ and $\delta_p$ by $\alpha_t$ and $\alpha_p$ respectively. The calculation of $C_t$ and $C_p$ then becomes:

$$C_t(i,t,p) = \sum_{\alpha=0}^{i}\sum_{\beta=0}^{t}\sum_{\gamma=0}^{p}(2^{\alpha_t\delta_t(\alpha,\beta,\gamma)}\cdot(h(i,t,p)>0)),$$

$$C_p(i,t,p) = \sum_{\alpha=0}^{i}\sum_{\beta=0}^{t}\sum_{\gamma=0}^{p}(2^{\alpha_p\delta_p(\alpha,\beta,\gamma)}\cdot(h(i,t,p)>0)).$$

The 3D-LUT as calculated by the method above can be highly non-linear. A 3D low pass filter may be needed to smoothen it. For example, 3D convolution can be applied for the smoothing step.

For each input (i,t,p), there are corresponding $C_t$(i,t,p) and $C_p$(i,t,p). This problem can be formulated as a polynomial regression to find the mapping from (i,t,p) to $C_t$(i,t,p) and $C_p$(i,t,p) via, for example, a multi-channel reshaping (MMR) technique. This technique can also be referred to as multi-variate, multiple regression. In the single channel method described above, an approximating polynomial contains power terms relative to that single channel. However, in the MMR method, polynomial terms may be a function of variables from several channels. For example, polynomial terms may be a function of a first and second chroma channel, a function of a chroma channel and a luma channel, or both chroma channels and the luma channel, depending on the embodiment.

To calculate the forward reshaping function via a MMR approximation, the following steps can be carried out. In a first step, the original normalized I/Ct/Cp (or I/T/P) values in the EDR domain are denoted as:

$$u_{j,k} = \begin{bmatrix} v_{j,k}^I \\ v_{j,k}^T \\ v_{j,k}^P \end{bmatrix}.$$

The MMR vector, $\bar{u}_{j,k}$, can be constructed based on $u_{j,k}$. For a $2^{nd}$ order MMR, the vector comprises 15 coefficients, while for a $3^{rd}$ order MMR, the vector comprises 22 coefficients. The MMR vectors are described, for example, in U.S. Pat. No. 8,811,490 B2. For example, in an embodiment, using a second order with cross-products MMR representation, the vector $\bar{u}_{j,k}$ may be expressed as $$\bar{u}_{j,k} = [\,1 \quad v_{j,k}^I \quad v_{j,k}^T \quad v_{j,k}^P$$
$$(v_{j,k}^I)^2(v_{j,k}^T)^2(v_{j,k}^P)^2$$
$$(v_{j,k}^I v_{j,k}^T)(v_{j,k}^I v_{j,k}^P)(v_{j,k}^T v_{j,k}^P)$$
$$(v_{j,k}^I)^2(v_{j,k}^T)^2(v_{j,k}^I)^2(v_{j,k}^P)^2(v_{j,k}^T)^2(v_{j,k}^P)^2$$
$$(v_{j,k}^I v_{j,k}^T v_{j,k}^P)(v_{j,k}^I v_{j,k}^T v_{j,k}^P)^2\,]^T.$$

In some embodiments, some terms in $\bar{u}_{j,k}$ may be removed to reduce the computational load. For example, it is possible to use in the model only one of the chroma components or eliminate completely certain high-order cross components.

To obtain the MMR vector, the two chroma channels mapped via $C_t$(i,t,p) and $C_p$(i,t,p) can be denoted as:

$$\tilde{s}_{j,k} = \begin{bmatrix} \tilde{s}_{j,k}^T \\ \tilde{s}_{j,k}^P \end{bmatrix}.$$

The chroma value predicted via MMR can be denoted as:

$$\hat{s}_{j,k} = \begin{bmatrix} \hat{s}_{j,k}^T \\ \hat{s}_{j,k}^P \end{bmatrix}.$$

In a subsequent step, the MMR matrix, $M_j^F$, can be obtained by minimizing a cost function. The cost function ensures that the predicted standard dynamic range (SDR) value, $\hat{S}_{j,k}$, is closest to $\tilde{S}_{j,k}$.

It should be noted that not all (i,t,p) entries have pixels. For example, supposing a picture has valid K (i,t,p) entries (i.e. h(i,t,p)>0), it is possible to put all entries in one matrix:

$$\bar{U}_j = \begin{bmatrix} \bar{u}_{j,0}^T \\ \bar{u}_{j,1}^T \\ \vdots \\ \bar{u}_{j,K-1}^T \end{bmatrix} \text{ and } \tilde{S}_j = \begin{bmatrix} \tilde{s}_{j,0}^T \\ \tilde{s}_{j,1}^T \\ \vdots \\ \tilde{s}_{j,K-1}^T \end{bmatrix}.$$

The predicted value is then:

$$\hat{S}_j = \begin{bmatrix} \hat{s}_{j,0}^T \\ \hat{s}_{j,1}^T \\ \vdots \\ \hat{s}_{j,K-1}^T \end{bmatrix} = \overline{U}_j M_j^F.$$

To minimize the difference between $\hat{S}$ and $\tilde{S}$:

$$\min_{M_F} \|\tilde{S}_j - \hat{S}_j\|^2 = \min_{M_F} \|\tilde{S}_j - \overline{U}_j M_j^F\|^2,$$

the least square method can be used, to obtain the optimal chroma forward reshaping function $M_j^F$:

$$M_j^F = (\overline{U}_j^T \overline{U}_j)^{-1} (\overline{U}_j^T \tilde{S}_j)$$

As described above, an image or video can be reshaped by a three dimensional LUT calculated via a cumulative sum. An MMR matrix can be generated via cost minimization between the chroma values predicted by the MMR matrix and the chroma values mapped by the three dimensional LUT. The method above can be extended to a scene based solution.

Having obtained the reshaped signal as described above, the backward reshaping function can be generated, to map it back to the original signal:

$$h_{j,k} = \begin{bmatrix} s_{j,k}^I \\ s_{j,k}^T \\ s_{j,k}^P \end{bmatrix}.$$

It is possible to construct the MMR polynomial, $\bar{h}_{j,k}$, based on $h_{j,k}$. The two chroma channels in the original EDR frames can be termed as:

$$\overline{q}_{j,k} = \begin{bmatrix} v_{j,k}^T \\ v_{j,k}^P \end{bmatrix}.$$

The chroma value predicted via MMR can be termed as:

$$\hat{v}_{j,k} = \begin{bmatrix} \hat{v}_{j,k}^T \\ \hat{v}_{j,k}^P \end{bmatrix}.$$

In the following, the purpose is to obtain the MMR backward reshaping matrix, $M_j^B$, to render the predicted EDR value, $\hat{v}_{j,k}$, closest to $\overline{q}_{j,k}$. For a picture with K valid entries, a single matrix can be generated:

$$\overline{H}_j = \begin{bmatrix} \bar{h}_{j,0}^T \\ \bar{h}_{j,1}^T \\ \vdots \\ \bar{h}_{j,K-1}^T \end{bmatrix} \text{ and } \overline{Q}_j = \begin{bmatrix} \overline{q}_{j,0}^T \\ \overline{q}_{j,1}^T \\ \vdots \\ \overline{q}_{j,K-1}^T \end{bmatrix}.$$

The predicted value is then:

$$\hat{V}_j = \begin{bmatrix} \hat{v}_{j,0}^T \\ \hat{v}_{j,1}^T \\ \vdots \\ \hat{v}_{j,K-1}^T \end{bmatrix} = \overline{H}_j M_j^B.$$

The minimization of the difference between $\hat{V}_j$ and $\overline{Q}_j$:

$$\min_{M_j^B} \|\overline{Q}_j - \hat{V}_j\|^2 = \min_{M_j^B} \|\overline{Q}_j - \overline{H}_j M_j^B\|^2,$$

can be carried out via the least squared method, to obtain the optimal chroma backward reshaping function $M_j^B$:

$$M_j^B = (\overline{H}_j^T \overline{H}_j)^{-1} (\overline{H}_j^T \overline{Q}_j)$$

The JND method described above has several advantages over other methods, such as the uniform quantizer. For example, the JND method requires a smaller number of codewords than the uniform quantizer. In an experiment performed by the inventors, the required number of codewords for a particular test video and a 32 JND ($N_p = N_t = 32$) was 50 codewords on average. Subjective testing results show that setting $N_p = N_t = 32$ JND does not result in a detectable color difference. Therefore, only about 50 codewords are needed, for each color channel, for a given 16-bit input. By comparison, increasing the JND to 48, thereby reducing the codewords to about 30, can display color artifacts. In general, experiments on different test videos have shown that setting $N_p$ and $N_t$ between 2 JND and 32 JND avoids detectable color differences.

In the present disclosure, several embodiments of the methods described referred to the JND. However, the same methods can be applied by referring to a difference that is not noticeable but close to the JND. In other words, the methods of the present disclosure can be directed at a just not noticeable difference instead of at a JND.

In some embodiments, the methods described above can be carried out in an encoder. As described above, the entire reshaping process contains 1) forward reshaping and 2) backward reshaping. Forward reshaping can be carried out at the encoder side. The backward reshaping function can be generated at the encoder side and then transmitted through a metadata bitstream. A decoder receives the metadata, and backward reshaping can be carried out at the decoder side via that metadata. In some embodiments, for the single-channel case, forward reshaping can be carried out in LUT format. For backward reshaping, since the function is in the metadata bitstream, the function can be compressed to save bandwidth. For example, the backward reshaping function can be compressed by using a multi piece $2^{nd}$ order polynomial.

Figure 3:
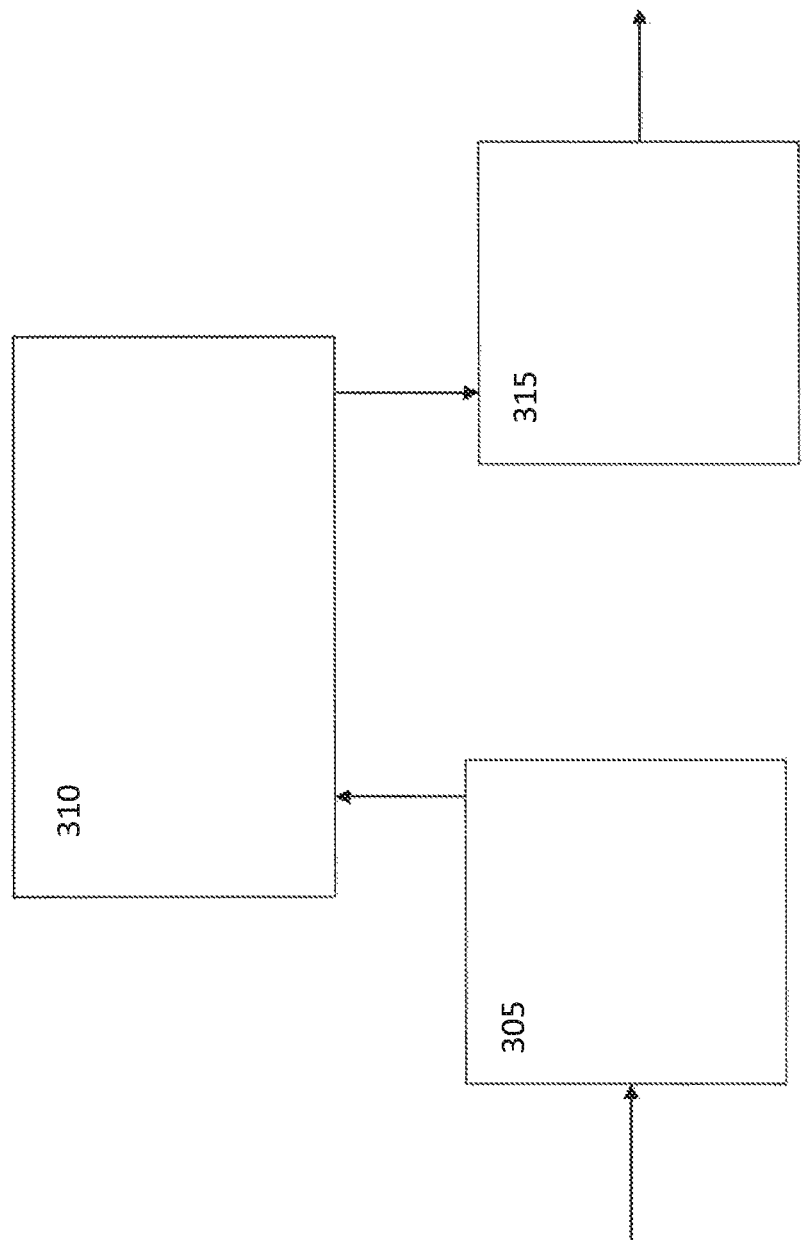
FIG. 3 illustrates an exemplary system for an encoder according to the methods of the present disclosure.

FIG. 3 illustrates an exemplary system for an encoder according to the methods of the present disclosure. For example, an input image or video frame is processed in a forward reshaping function module (305). The image or frame can then be processed for any further coding (310), while a backward shaping module (315) can generate a backward shaping function. In some embodiments, the modules of FIG. 3 can be implemented as separate processors or as a single processor in an encoder. An output image or video frame is then transmitted, for example to a decoder. The actual backward shaping can be applied to an image at a decoder based on metadata generated by the backward shaping module (315) which generates the backward shaping function at the encoder. Therefore, a forward reshaped signal can be encoded at the encoder, and transmitted with the relevant metadata to the decoder. The decoder can then decode the received transmitted bitstream, and apply the backward reshaping function to recover the original signal.

Figure 4:
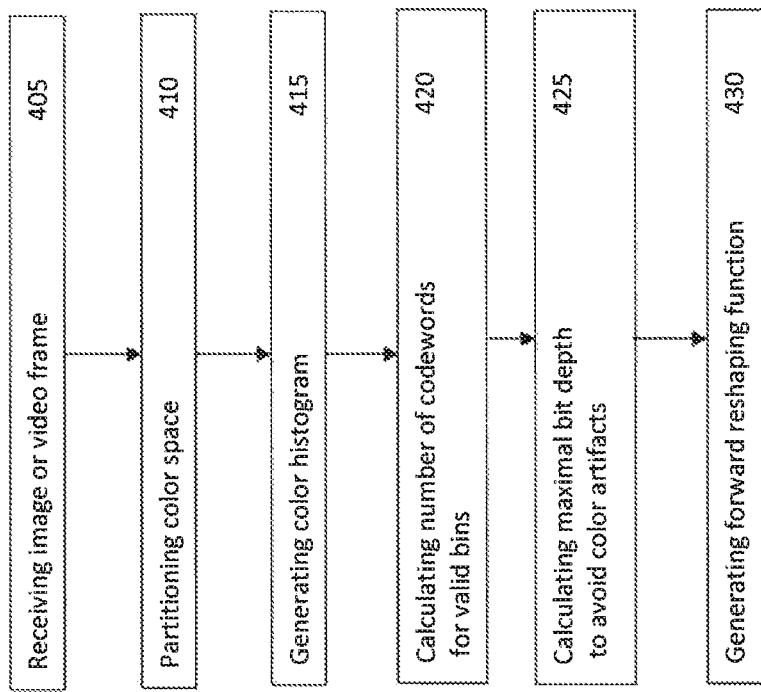
FIG. 4 illustrates an exemplary flowchart for one embodiment of the methods of the present disclosure.

FIG. 4 illustrates an exemplary flowchart for one embodiment of the methods of the present disclosure. After receiving an image or video frame (405), the color space is partitioned (410), a color histogram is generated (415), the required number of codewords is generated for valid bins (420), the maximal bit depth to avoid color artifacts is found (425), and the forward reshaping function is generated (430).

Figure 5:
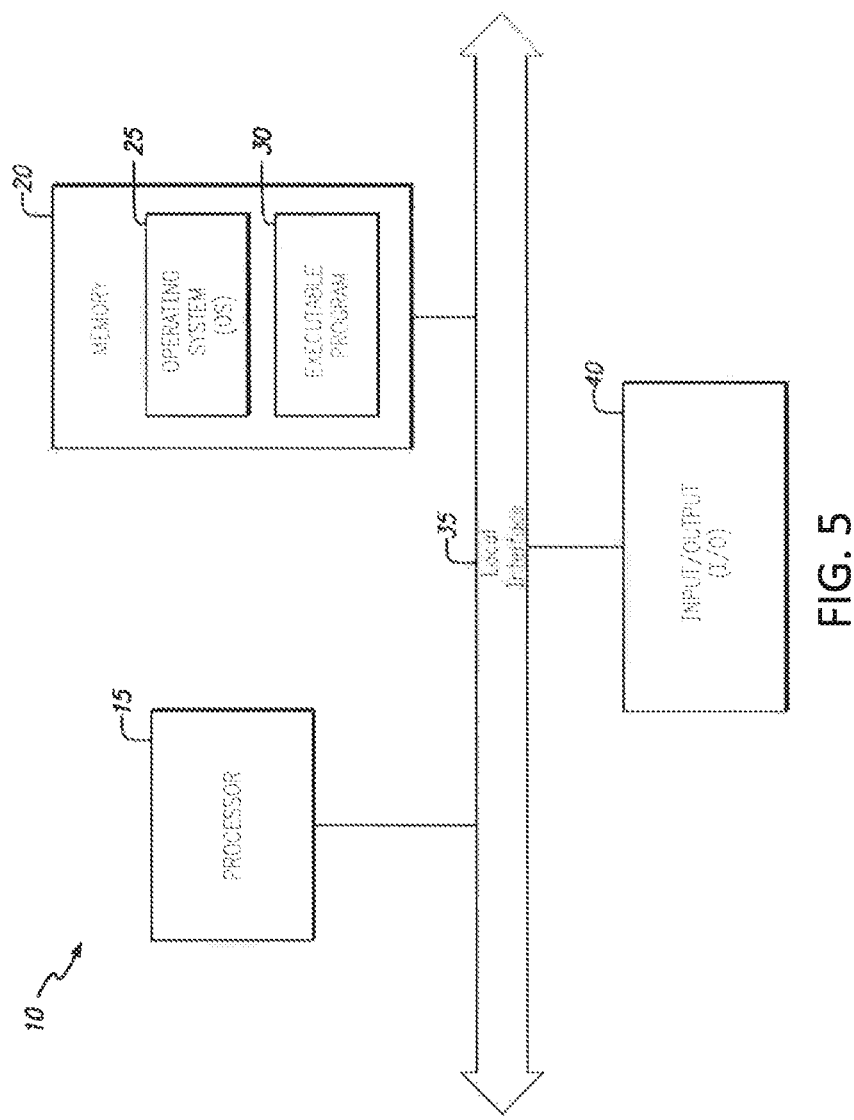
FIG. 5 depicts an exemplary embodiment of a target hardware for implementation of an embodiment of the present disclosure.

FIG. 5 is an exemplary embodiment of a target hardware (10) (e.g., a computer system) for implementing the embodiments of FIGS. 1-4. This target hardware comprises a processor (15), a memory bank (20), a local interface bus (35) and one or more Input/Output devices (40). The processor may execute one or more instructions related to the implementation of FIGS. 1-4, and as provided by the Operating System (25) based on some executable program (30) stored in the memory (20). These instructions are carried to the processor (15) via the local interface (35) and as dictated by some data interface protocol specific to the local interface and the processor (15). It should be noted that the local interface (35) is a symbolic representation of several elements such as controllers, buffers (caches), drivers, repeaters and receivers that are generally directed at providing address, control, and/or data connections between multiple elements of a processor based system. In some embodiments the processor (15) may be fitted with some local memory (cache) where it can store some of the instructions to be performed for some added execution speed. Execution of the instructions by the processor may require usage of some input/output device (40), such as inputting data from a file stored on a hard disk, inputting commands from a keyboard, inputting data and/or commands from a touchscreen, outputting data to a display, or outputting data to a USB flash drive. In some embodiments, the operating system (25) facilitates these tasks by being the central element to gathering the various data and instructions required for the execution of the program and provide these to the microprocessor. In some embodiments the operating system may not exist, and all the tasks are under direct control of the processor (15), although the basic architecture of the target hardware device (10) will remain the same as depicted in FIG. 5. In some embodiments a plurality of processors may be used in a parallel configuration for added execution speed. In such a case, the executable program may be specifically tailored to a parallel execution. Also, in some embodiments the processor (15) may execute part of the implementation of FIGS. 1-4, and some other part may be implemented using dedicated hardware/firmware placed at an Input/Output location accessible by the target hardware (10) via local interface (35). The target hardware (10) may include a plurality of executable programs (30), wherein each may run independently or in combination with one another.

In an embodiment, a method comprises:
receiving, by a computer, at least one image or video frame;
for a color space of the at least one image or video frame, partitioning, by the computer, the color space in $M_1 \times M_2 \times M_3$ non-overlapping bins;

determining for each bin whether it is a valid bin, a valid bin being a bin for which the at least one image or video frame has at least one pixel with a color value falling within said bin;
for each chroma channel of the color space:
calculating, by the computer and for each valid bin, a required number of codewords necessary for the respective chroma channel to represent, without a noticeable difference, two color values in said valid bin that have consecutive codewords for the respective chroma channel;
generating, by the computer, at least one content-aware chroma forward reshaping function, based on the calculated required numbers of codewords;
applying, by the computer, the at least one content-aware chroma forward reshaping function to the at least one image or video frame.

The at least one image or video frame comprises a plurality of pixels, each having a color value. The color value comprises a luma value, a first chroma value and a second chroma value. Each bin of the color space partitioning spans a range of luma values in a luma direction, a range of first chroma values in a first chroma direction and a range of second chroma values in a second chroma direction. Therefore, for each bin it can be determined whether the at least one image or video frame has at least one pixel with a color value that falls within the luma, first chroma and second chroma range spanned by said bin.

The required number of codewords corresponds to the minimum number of codewords necessary for representing the chroma range of the respective bin without noticeable color artefacts. For example, the input image may use L codewords for each bin for representing a chroma channel, e.g. with a bit-depth of 16, $L=2^{16}/M$. The number L is in general greater than necessary to represent the chroma channel: no color difference will be noticeable between colors having a chroma value represented by two consecutive codewords. The method of embodiments of this disclosure in general reduces the number of codewords used for each bin. In fact, the method calculates a minimum number of codewords for each valid bin that still ensures that no noticeable difference occurs between two color values in said valid bin that have consecutive codewords for the respective chroma channel. In other words, the calculated minimum number of codewords can be used to re-quantize the input chroma codewords to (a typically smaller number of) output chroma codewords without a noticeable difference in color.

In other words, the required number of codewords correspond to a required number of quantization levels in a valid bin necessary to represent values neighboring in color space without a noticeable difference.

At least one content-aware forward reshaping function is calculated. In a first embodiment, a single channel chroma forward reshaping function is generated for each chroma channel. In an alternative embodiment, the at least one content-aware chroma forward reshaping function comprises a multi channel chroma forward reshaping function.

The $M_1 \times M_2 \times M_3$ non-overlapping bins of the partitioning of the color space comprise $M_1$ arrays of $M_2 \times M_3$ bins in a luma direction, $M_2$ arrays of $M_1 \times M_3$ bins in a first chroma direction and $M_3$ arrays of $M_1 \times M_2$ bins in a second chroma direction. In an embodiment having a single channel chroma forward reshaping function for each chroma channel, the method further comprises: calculating, by the computer, for each of the $M_2$ arrays in the first chroma direction, a first maximum value among the calculated required numbers of codewords of the valid bins in the respective array; and calculating, by the computer, for each of the $M_3$ arrays in the second chroma direction, a second maximum value among the calculated required numbers of codewords of the valid bins in the respective array.

The bins can be identified by a bin index ($i_{luma}$, $i_{first\ chroma}$, $i_{second\ chroma}$), wherein $0 \leq i_{luma} < M_1$ is an index for the luma direction, $0 \leq i_{first\ chroma} < M_2$ is an index for the first chroma direction and $0 \leq i_{second\ chroma} < M_3$ is an index for the second chroma direction. In an example wherein the color space is the $IC_TC_P$ color space, ($i_{luma}$, $i_{first\ chroma}$, $i_{second\ chroma}$)=(i, t,p). For each of the $M_2$ indices $i_{first\ chroma}$ in the first chroma direction, the maximum value of the calculated required numbers of codewords is determined among all valid bins having said $i_{first\ chroma}$ index. Likewise, for the second chroma direction, for each of the $M_3$ indices $i_{second\ chroma}$ the maximum values of the calculated required number of codewords is determined among all valid bins having said $i_{second\ chroma}$.

In an embodiment having a single channel chroma forward reshaping function, the method may further comprise: building a codeword look-up table.

In an embodiment having a multi channel chroma forward reshaping function, the method may further comprise: calculating a cumulative sum of the calculated required numbers of codewords over the $M_1 \times M_2 \times M_3$ non-overlapping bins to obtain a three dimensional look-up table.

For example, this embodiment may calculating $C_t(i,t,p)$ and $C_p(i,t,p)$ as described above.

In a further embodiment, the method may comprise calculating a multi-channel forward reshaping matrix by minimizing a cost function between chroma values of the at least one image or video frame predicted by the multi-channel forward reshaping matrix and chroma values obtained by mapping the at least one image or video frame using the three dimensional look-up table.

For example, this embodiment may calculate $M_j^F$ as described above.

In an embodiment, the method may further comprise generating, by the computer, at least one backward reshaping function based on the at least one content-aware chroma forward reshaping function. For example, the method may comprise approximating, by the computer, the at least one backward reshaping function by a polynomial function, such as a multi-piece $2^{nd}$ order polynomial function.

In a further embodiment, the method may comprise generating a look-up table via inverse scanning of the at least one content-aware chroma forward reshaping function.

In embodiments wherein a multi channel chroma forward reshaping function is generated, generating the at least one backward reshaping function may comprise calculating a multi-channel backward reshaping matrix by minimizing a cost function between chroma values of the at least one image or video frame predicted by the multi-channel backward reshaping matrix and chroma values resulting from applying the multi-channel chroma forward reshaping function to the at least one image or video frame.

In an embodiment, the step of calculating, by the computer, for the respective chroma channel the required number of codewords for each valid bin comprises:

accessing a content independent partitioning of the color space for said respective chroma channel, that has $M_1 \times M_2 \times M_3$ non-overlapping bins, with $M_1$ rows of $M_2 \times M_3$ bins in the luma direction, $M_2$ rows of $M_1 \times M_3$ bins in the first chroma direction and $M_3$ rows of $M_1 \times M_2$ bins in the second chroma direction, wherein each bin is linked to a required number of codewords.

In other words, a pre-determined $M_1 \times M_2 \times M_3$ array is accessed, each element of the array storing a required number of codewords. The array is content independent, and may be obtained by performing tests, e.g. the JND measurements algorithms described earlier or the test illustrated in FIG. 1. The method step of calculating a required number of codewords for each valid bin then comprises copying the required number of codewords stored in the corresponding element of the pre-determined $M_1 \times M_2 \times M_3$ array.

The methods and systems described in the present disclosure may be implemented in hardware, software, firmware or any combination thereof. Features described as blocks, modules or components may be implemented together (e.g., in a logic device such as an integrated logic device) or separately (e.g., as separate connected logic devices). The software portion of the methods of the present disclosure may comprise a computer-readable medium which comprises instructions that, when executed, perform, at least in part, the described methods. The computer-readable medium may comprise, for example, a random access memory (RAM) and/or a read-only memory (ROM). The instructions may be executed by a processor (e.g., a digital signal processor (DSP), an application specific integrated circuit (ASIC), a field programmable logic array (FPGA), a graphic processing unit (GPU) or a general purpose GPU).

A number of embodiments of the disclosure have been described. Nevertheless, it will be understood that various modifications may be made without departing from the spirit and scope of the present disclosure. Accordingly, other embodiments are within the scope of the following claims.

The examples set forth above are provided to those of ordinary skill in the art as a complete disclosure and description of how to make and use the embodiments of the disclosure, and are not intended to limit the scope of what the inventor/inventors regard as their disclosure.

Modifications of the above-described modes for carrying out the methods and systems herein disclosed that are obvious to persons of skill in the art are intended to be within the scope of the following claims. All patents and publications mentioned in the specification are indicative of the levels of skill of those skilled in the art to which the disclosure pertains. All references cited in this disclosure are incorporated by reference to the same extent as if each reference had been incorporated by reference in its entirety individually.

Various aspects of the present invention may be appreciated from the following enumerated example embodiments (EEEs).

EEE 1. A method comprising:
  receiving, by a computer, at least one image or video frame;
  for at least one chroma channel of the at least one image or video frame, partitioning, by the computer, the at least one chroma channel in a plurality of non-overlapping bins;
  generating, by the computer, a color histogram of the at least one image or video frame, based on the partitioning;
  calculating, for the plurality of non-overlapping bins, a pixel count for each bin, thereby obtaining a plurality of valid bins having a pixel count greater than zero;
  calculating, by the computer and for each valid bin of the plurality of valid bins, a required number of codewords necessary to observe a just-noticeable-difference in each valid bin;

calculating a maximal bit depth necessary to avoid color artifacts in the at least one image or video frame, based on a maximum value among the required number of codewords;

generating, by the computer, a content-aware chroma forward reshaping function, based on the maximal bit depth;

applying, by the computer, the content-aware chroma forward reshaping function to the at least one image or video frame.

EEE 2. The method of EEE 1, wherein generating, by the computer, a content-aware chroma forward reshaping function comprises building a codeword bit depth look-up table.

EEE 3. The method of EEE 1, wherein the content-aware chroma forward reshaping function is single channel.

EEE 4. The method of EEE 3, further comprising generating, by the computer, a backward reshaping function based on the content-aware chroma forward reshaping function.

EEE 5. The method of EEE 2, wherein the content-aware chroma forward reshaping function is multi channel and the codeword bit depth look-up table is three dimensional.

EEE 6. The method of EEE 4, further comprising approximating, by the computer, the backward reshaping function by a polynomial function.

EEE 7. The method of EEE 5, wherein the polynomial function has terms dependent on quantities of a luma channel and a first and second chroma channels.

EEE 8. The method of EEE 4, wherein generating, by the computer, the backward reshaping function comprises generating a look-up table via inverse scanning of the content-aware chroma forward reshaping function.

EEE 9. The method of EEE 6, wherein the polynomial function is a multi-piece $2^{nd}$ order polynomial function.

EEE 10. The method of EEE 1, wherein the at least one chroma channel comprises two chroma channels and the required number of codewords is 50 codewords for each chroma channel.

EEE 11. The method of EEE 10, wherein the two chroma channels belong to the ICtCp color space.

EEE 12. The method of EEE 1, wherein partitioning, by the computer, the at least one chroma channel comprises partitioning, by the computer, a color space in $M_1 \times M_2 \times M_3$ non-overlapping parallelepipeds.

EEE 13. The method of EEE 1, wherein calculating, by the computer and for each valid bin of the plurality of valid bins, a required number of codewords comprises generating a test pattern.

EEE 14. The method of EEE 13, wherein generating a test pattern comprises:

generating a plurality of rectangles within a background;

varying a chroma value within the plurality of rectangles while keeping a fixed chroma value within the background;

selecting a minimal bit depth, for each rectangle of the plurality of rectangles, required for the just-noticeable-difference;

selecting a maximal bit depth among the minimal bit depths, as the minimum bit depth necessary to avoid color artifacts.

EEE 15. The method of EEE 12, wherein generating, by the computer, a content-aware chroma forward reshaping function comprises calculating, for the at least one image or video frame, a maximal value and a minimal value in a luma channel of the color space, a maximal value and a minimal value in a first color channel of the color space, a maximal value and a minimal value in a second color channel of the color space, and a pixel count for each non-overlapping cube.

EEE 16. The method of EEE 1, further comprising smoothing the content-aware chroma forward reshaping function.

EEE 17. The method of EEE 16, wherein smoothing is by moving average.

EEE 18. The method of EEE 1, wherein obtaining a minimum bit depth is for each valid bin, and generating, by the computer, a content-aware chroma forward reshaping function comprises summing the minimum bit depth over the plurality of non-overlapping bins to obtain a look-up table.

EEE 19. The method of EEE 10, wherein obtaining a minimum bit depth is for each valid bin, and generating, by the computer, a content-aware chroma forward reshaping function comprises summing the minimum bit depth over the plurality of non-overlapping bins to obtain a three dimensional look-up table.

EEE 20. The method of EEE 19, wherein generating, by the computer, a content-aware chroma forward reshaping function further comprises calculating a multi-channel forward reshaping matrix by minimizing a cost function between first chroma values of the at least one image or video frame predicted by the multi-channel forward reshaping matrix and second chroma values of the at least one image or video frame mapped by the three dimensional look-up table.

EEE 21. The method of EEE 6, further comprising generating metadata for the approximated backward reshaping function, and transmitting the metadata to a decoder.

EEE 22. The method of EEE 1, wherein:

partitioning, by the computer, the at least one chroma channel in a plurality of non-overlapping bins comprises partitioning a first chroma channel in a first plurality of non-overlapping bins and a second chroma channel in a second plurality of non-overlapping bins, calculating a pixel count is for the first and second pluralities of non-overlapping bins, calculating a required number of codewords comprises calculating a first number of codewords for each valid bin of the first plurality of valid bins, and a second number of codewords for each valid bin of the second plurality of valid bins, calculating a maximal bit depth based on a maximum value among the required number of codewords comprises calculating a first maximal bit depth based on the first number of codewords and a second maximal bit depth based on the second number of codewords, and generating, by the computer, a content-aware chroma forward reshaping function is based on the first and second maximal bit depths.

EEE 23. The method of EEE 1, wherein calculating a maximal bit depth necessary to avoid color artifacts in the at least one image or video frame is further based on an adjustment factor.

EEE 24. The method of EEE 22, wherein calculating a first maximal bit depth is further based on a first adjustment factor $\alpha_t$, and calculating a second maximal bit depth is further based on a second adjustment factor $\alpha_p$.

EEE 25. The method of EEE 17, wherein smoothing comprises averaging over a width of two bins and taking a cumulative sum over the plurality of valid bins.

EEE 26. The method of EEE 1, wherein the at least one image or video frame comprises a plurality of images or video frames forming one scene in a video.

EEE 27. The method of EEE 5, further comprising generating, by the computer, a backward reshaping function based on the content-aware chroma forward reshaping function.

EEE 28. The method of EEE 20, further comprising generating, by the computer, a backward reshaping function based on the content-aware chroma forward reshaping function.

It is to be understood that the disclosure is not limited to particular methods or systems, which can, of course, vary. It is also to be understood that the terminology used herein is for the purpose of describing particular embodiments only, and is not intended to be limiting. As used in this specification and the appended claims, the singular forms "a," "an," and "the" include plural referents unless the content clearly dictates otherwise. The term "plurality" includes two or more referents unless the content clearly dictates otherwise. Unless defined otherwise, all technical and scientific terms used herein have the same meaning as commonly understood by one of ordinary skill in the art to which the disclosure pertains.

The invention claimed is:

1. A method comprising:
   receiving, by a computer, at least one image or video frame;
   for a color space of the at least one image or video frame, partitioning, by the computer, the color space in M1×M2×M3 non-overlapping bins;
   determining for each bin whether it is a valid bin, a valid bin being a bin for which the at least one image or video frame has at least one pixel with a color value falling within said bin;
   for each chroma channel of the color space:
      calculating, by the computer and for each valid bin, a required number of codewords necessary for the respective chroma channel to represent, without a noticeable difference, two color values in said valid bin that have consecutive codewords for the respective chroma channel;
      generating, by the computer, at least one content-aware chroma forward reshaping function, based on the calculated required numbers of codewords;
   applying, by the computer, the at least one content-aware chroma forward reshaping function to the at least one image or video frame.

2. The method of claim 1, wherein the at least one content-aware chroma forward reshaping function comprises a single channel chroma forward reshaping function for each chroma channel.

3. The method of claim 2, wherein the M1×M2×M3 non-overlapping bins of the partitioning of the color space comprise M1 arrays of M2×M3 bins in a luma direction, M2 arrays of M1×M3 bins in a first chroma direction and M3 arrays of M1×M2 bins in a second chroma direction, the method further comprising:
   calculating, by the computer, for each of the M2 arrays in the first chroma direction, a first maximum value among the calculated required numbers of codewords of the valid bins in the respective array; and
   calculating, by the computer, for each of the M3 arrays in the second chroma direction, a second maximum value among the calculated required numbers of codewords of the valid bins in the respective array.

4. The method of claim 1, wherein generating, by the computer, the at least one content-aware chroma forward reshaping function comprises building a codeword look-up table.

5. The method of claim 1, wherein the at least one content-aware chroma forward reshaping function comprises a multi channel chroma forward reshaping function.

6. The method of claim 5, wherein generating, by the computer, the at least one content-aware chroma forward reshaping function comprises calculating a cumulative sum of the calculated required numbers of codewords over the M1×M2×M3 non-overlapping bins to obtain a three dimensional look-up table.

7. The method of claim 6, wherein generating, by the computer, the at least one content-aware chroma forward reshaping function further comprises calculating a multi-channel forward reshaping matrix by minimizing a cost function between chroma values of the at least one image or video frame predicted by the multi-channel forward reshaping matrix and chroma values obtained by mapping the at least one image or video frame using the three dimensional look-up table.

8. The method of claim 5, further comprising generating, by the computer, at least one backward reshaping function based on the at least one content-aware chroma forward reshaping function.

9. The method of claim 8, further comprising approximating, by the computer, the at least one backward reshaping function by a polynomial function.

10. The method of claim 9, wherein the polynomial function is a multi-piece 2nd order polynomial function.

11. The method of claim 8, wherein generating, by the computer, the at least one backward reshaping function comprises generating a look-up table via inverse scanning of the at least one content-aware chroma forward reshaping function.

12. The method of claim 8, wherein generating, by the computer, the at least one backward reshaping function comprises calculating a multi-channel backward reshaping matrix by minimizing a cost function between chroma values of the at least one image or video frame predicted by the multi-channel backward reshaping matrix and chroma values resulting from applying the multi channel chroma forward reshaping function to the at least one image or video frame.

13. The method of claim 1, wherein the color space is the ICtCp color space.

14. The method of claim 1, wherein the step of calculating, by the computer, for the respective chroma channel the required number of codewords for each valid bin comprises:
   accessing a content independent partitioning of the color space for said respective chroma channel, that has M1×M2×M3 non-overlapping bins, with M1 rows of M2×M3 bins in the luma direction, M2 rows of M1×M3 bins in the first chroma direction and M3 rows of M1×M2 bins in the second chroma direction, wherein each bin is linked to a required number of codewords.

15. A data-processing system configured to perform with one or more processors the method according to claim 1.

16. A tangible, non-transitory, computer program product having instructions which, when executed by a computing device or system, cause said computing device or system to perform the method according to claim 1.

* * * * *